Figure 1:
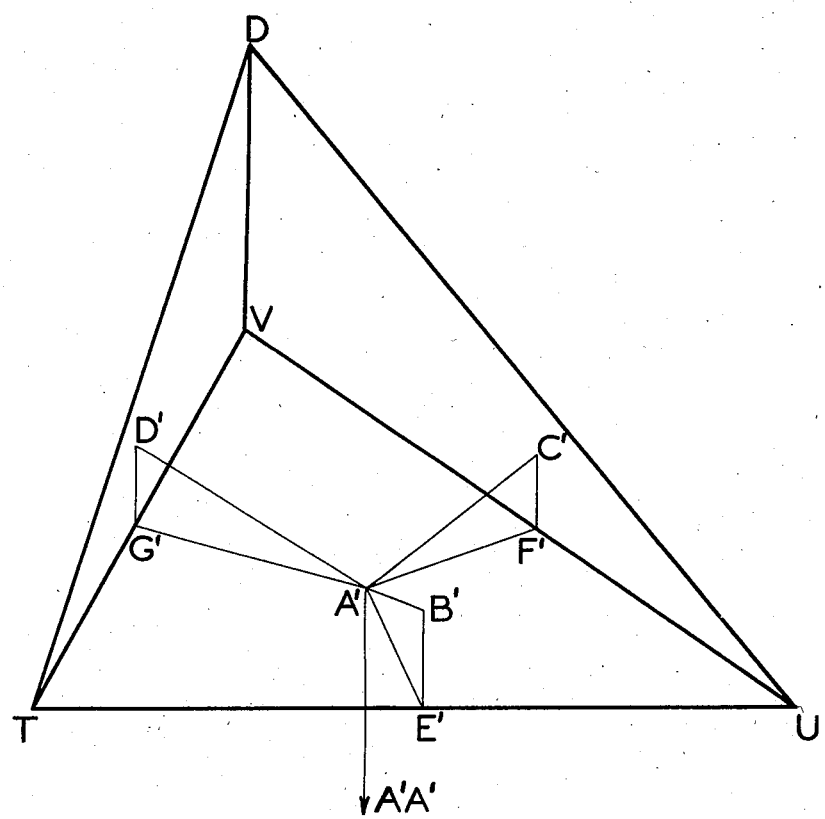

Nov. 6, 1951

M. DE GROOTE ET AL 2,573,893

CERTAIN POLYOL ETHERS

Filed Dec. 22, 1949

4 Sheets-Sheet 1

FIG.I.

INVENTORS,

Nov. 6, 1951  M. DE GROOTE ET AL  2,573,893
CERTAIN POLYOL ETHERS
Filed Dec. 22, 1949  4 Sheets-Sheet 3

INVENTORS,

Patented Nov. 6, 1951

2,573,893

UNITED STATES PATENT OFFICE 2,573,893

CERTAIN POLYOL ETHERS

Melvin De Groote, University City, and Bernhard Keiser, Webster Groves, Mo., assignors to Petrolite Corporation, Ltd., Wilmington, Del., a corporation of Delaware Application December 22, 1949, Serial No. 134,580

7 Claims. (Cl. 260—53)

1

The present invention is concerned with certain new chemical products, compounds, or compositions which have useful application in various arts. It includes methods or procedures for manufacturing said new chemical products, compounds or compositions, as well as the products, compounds or compositions themselves.

We have discovered that if one treats a suitable phenol-aldehyde resin as hereinafter described with a combination of glycide, propylene oxide, and ethylene oxide within the proportions hereinafter specified, the mixed phenol-aldehyde glycol ether so obtained is unusually effective as a demulsifying agent for water-in-oil emulsions, and also has utility in various other arts hereinafter described. One specific example exemplifying the herein contemplated compounds is the product obtained by reacting 12.5 pounds of an amylphenol formaldehyde resin with 2.5 pounds of glycide, and 8.4 pounds of propylene oxide, followed by reaction with 6.5 pounds of ethylene oxide. Such oxyalkylations are usually conducted in presence of an alkaline catalyst, and actually produce a cogeneric mixture. This specific compound, or better still, cogeneric mixture just mentioned, is only one of a series of similar compounds or mixtures having, in the main, the same general structure or composition.

Previous reference has been made to the fact that the herein specified products are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

This specific application or use of our reagents is described and claimed in our co-pending application, Serial No. 134,579, filed December 22, 1949.

The compounds or cogeneric mixtures herein described are not only useful for breaking oil field emulsions but also are useful for various other purposes, such as a break-inducer in the doctor treatment of sour hydrocarbons, as an emulsifying agent, as a component in the preparation of micellar solutions, as an additive to non-hydrocarbon lubricants, as an intermediate for further reaction by virtue of the terminal hydroxyl radical, etc.

In subsequent paragraphs from time to time reference is made to "compounds or cogeneric mixtures." At first glance it may appear that such language is indefinite and, perhaps, contradictory. It is the intention at the moment only to point out that there is no inconsistency in such description, and that, subsequently, there

2 will be a complete explanation of why such designation is entirely proper.

As has been pointed out previously the present invention is concerned with certain reaction products or cogeneric mixtures obtained from four reactants or components combined in specific proportions as hereinafter described in detail. There is no difficulty in setting forth in graphic form a somewhat similar mixture obtained from three components instead of four, i. e., from a suitable phenol-aldehyde resin, ethylene oxide and propylene oxide as distinguished from a quaternary mixture employing the same three reactants and also glycide in addition.

Our co-pending applications, Serial Nos. 129,707 and 129,708, filed November 28, 1949, of which Serial No. 129,707 is now Patent 2,557,081, issued June 19, 1951, describe tertiary mixtures using the conventional triangular graph. The transition from a triangular graph to what would normally be a space model (a regular tetrahedron) followed by subsequent modification so as to transform a three-dimensional model within certain limitations to a two-dimensional plane, presents a certain amount of detailed text and for this reason what is said subsequently will appear in certain parts or divisions, as follows:

Part 1 is concerned with the importance of glycide in affecting the structure of the derivatives, and the method of presentation herein employed with reference to Figures 1, 2, 3 and 4.

Part 2 is concerned with the production of the phenol-aldehyde resins which are used and with products prepared from phenol-aldehyde resins, ethylene oxide, and propylene oxide which, when combined with glycide, form useful compositions of the invention, and is presented largely in terms of Patent 2,499,370, which describes the resins in detail, and Patent 2,557,081, which describes the treatment of the resins with both ethylene oxide and propylene oxide.

Part 3 is concerned with the preparation of the compounds employing four components or four reactants and in its simplest form perhaps obtainable by treating the tertiary mixtures of Part 2 preceding with glycide within the range hereinafter specified, i. e., that the final reaction product, or cogeneric mixtures, contain at least 2% and not more than 25% of glycide.

Part 4 consists of tables in which the limiting values are set forth in detail in tabular form so that the invention is set forth with particularity by this particular means without necessary reference to the figures. Obviously, of course, such tables could not suitably be incorporated in the claims, and such tables represent the outside or limiting values only and do not include the intermediate values. This is the reason that the claims refer to the figures.

PART 1

The present invention is concerned with a cogeneric mixture which is the end product of a reaction or reactions involving 4 reactants. Assuming completeness of reaction and based on a mathematical average, the final product is characterized most conveniently in terms of the 4 component reactants. This phase of the invention is described elsewhere in greater detail.

In representing a mixture or an end product derived from 2 components or 3 components, there is no difficulty as far as using the plane surface of an ordinary printed sheet. For example, a 3-component system is usually represented by a triangle in which the apexes represent 100% of each component and any mixture or reaction product in terms of the 3 components is represented by a point in the triangular area in which the composition is indicated by perpendiculars from such point to the sides. Such representation is employed, for example, in our co-pending applications, Serial Nos. 129,707 and 129,708, filed November 28, 1949.

Chemists and physicists ordinarily characterize a 4-component system by using a solid, i. e., a regular tetrahedron. In this particular presentation each point or apex represents 100% of each of the 4 components, each of the 6 edges represented a line or binary mixture of the 2 components represented by the apexes or points at the end of the line or edge. Each of the 4 triangles or faces represent a tertiary mixture of the 3 components represented by the 3 corners or apexes and obviously signify the complete absence of the 4th component indicated by the corner or apex opposite the triangular face.

However, as soon as one moves to a point within the regular tetrahedron one has definitely characterized and specified a 4-component mixture in which the 4 components add up to 100%.

In accompanying Figure 1 an attempt is made to illustrate this system of representation visibly in a plane surface. For sake of convenience one need only consider a regular tetrahedron resting on one face or triangular surface. If somewhere towards the middle of such tetrahedron one places a plane parallel to the base of the tetrahedron one again obtains an equilateral triangle which, of course, is reduced in size compared with the equilateral triangle which is the bottom of the regular tetrahedron. In Figure 1 the tetrahedron may be considered as formed by some transparent material and for convenience the new tetrahedron formed by the passage of the horizontal plane is, of course, a regular tetrahedron also. For convenience, one can consider that he is looking directly at this tetrahedron which is shown somewhat distorted for purpose of convenience, and in the smaller regular tetrahedron the apexes are T, U, V and D. The lines are TU, VU, TV and VD. The four equilateral triangles are TVD, UVD, TUV and TUD. Bearing in mind that this tetrahedron is just the upper part of what is assumed for purpose of illustration that a point has been selected within this larger tetrahedron to indicate a specific mixture composed of 4 components. For convenience, the point is taken as A'. If from A' perpendiculars are erected to each of the four planes then there are designated at least three of them by lines which are shown and indicated as follows: A'B', A'C', A'D'. The fourth perpendicular goes from A' to the point in the plane beneath which is the assumed base of the original larger regular tetrahedron. Since the larger tetrahedron is not shown for the reason that it would only add confusion; this perpendicular is indicated simply by the line A'—A'A'.

Figure 2:
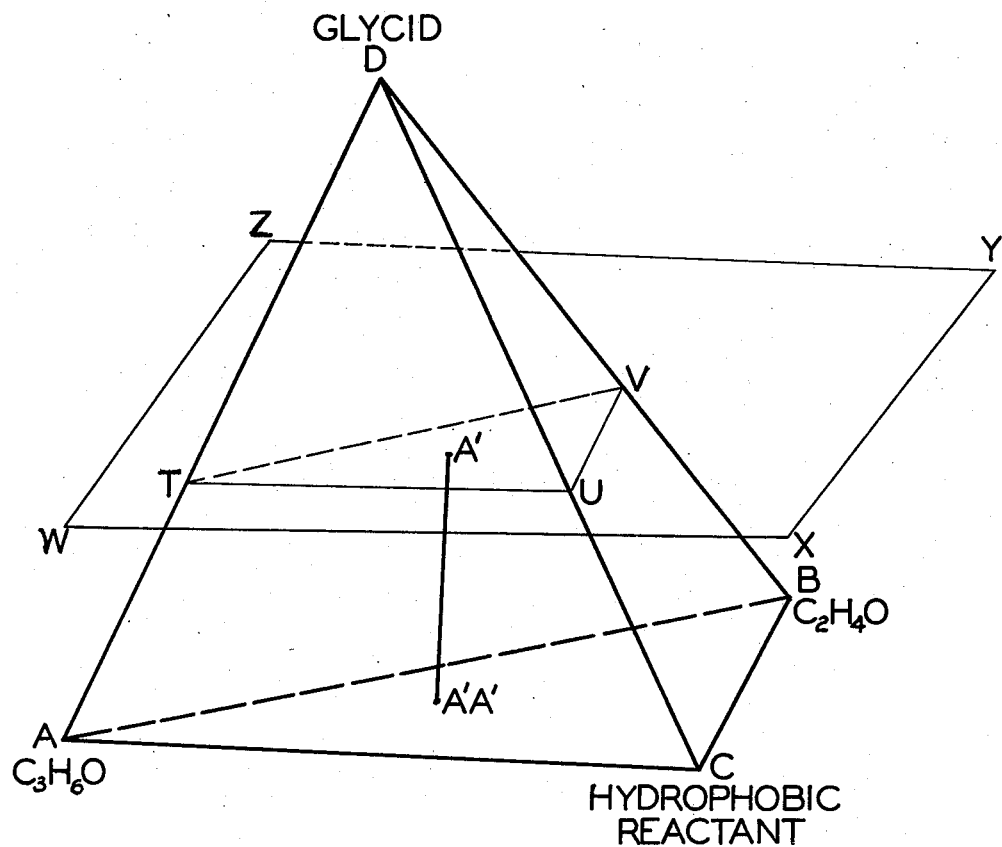

What has been said previously is illustrated in a slightly different aspect actually showing both the large tetrahedron and the plane in Figure 2. In this instance again the regular tetrahedron must be presented in a somewhat distorted aspect in order to show what is desired. The present invention is concerned with a cogeneric mixture derived from 4 components, to wit, ethylene oxide, propylene oxide, glycide, and hydrophobic reactant which is susceptible to react with the 3 enumerated alkylene oxides. These 4 components or initial reactants represent the 4 points or apexes of the regular tetrahedron and it will be noted that in this presentation the 4 apexes are marked A, B, C and D. A represents 100% of propylene oxide, B represents 100% of ethylene oxide, D represents 100% of glycide and C represents 100% of hydrophobic reactant.

Referring momentarily to what has been said in regard to Figure 1 it will be noted that a perpendicular which is comparable is shown as a line connecting point A with point A'A'. More important, however, is this fact, that when a plane is placed parallel to the base such plane of necessity has the same configuration as the base. If one selected some particular figure in the base, for instance a triangle, a square, a rectangle, a pentagon, or the like, and drew lines from the corners or apexes of such plane figure in the base, to the top apex D, then that same figure but in a reduced size would appear in the intersecting plane TUV shown in this particular figure. TUV is the equilateral triangle furnished by the intersecting plane WXYZ which intersects the regular tetrahedron parallel to the base.

Figure 3:
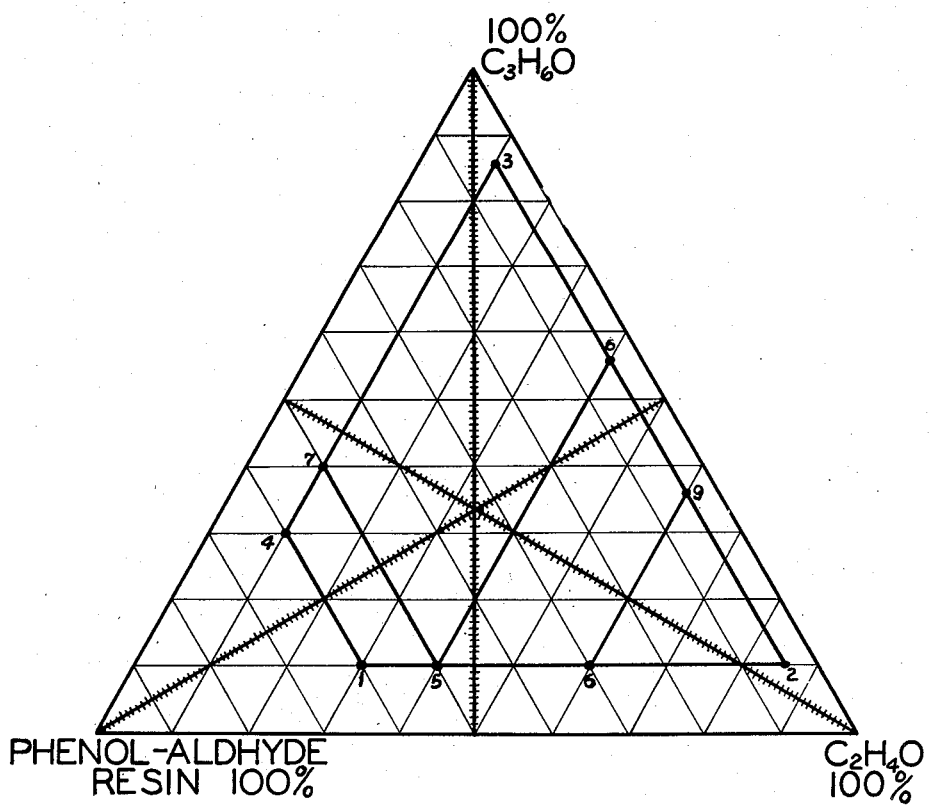
Figure 4:
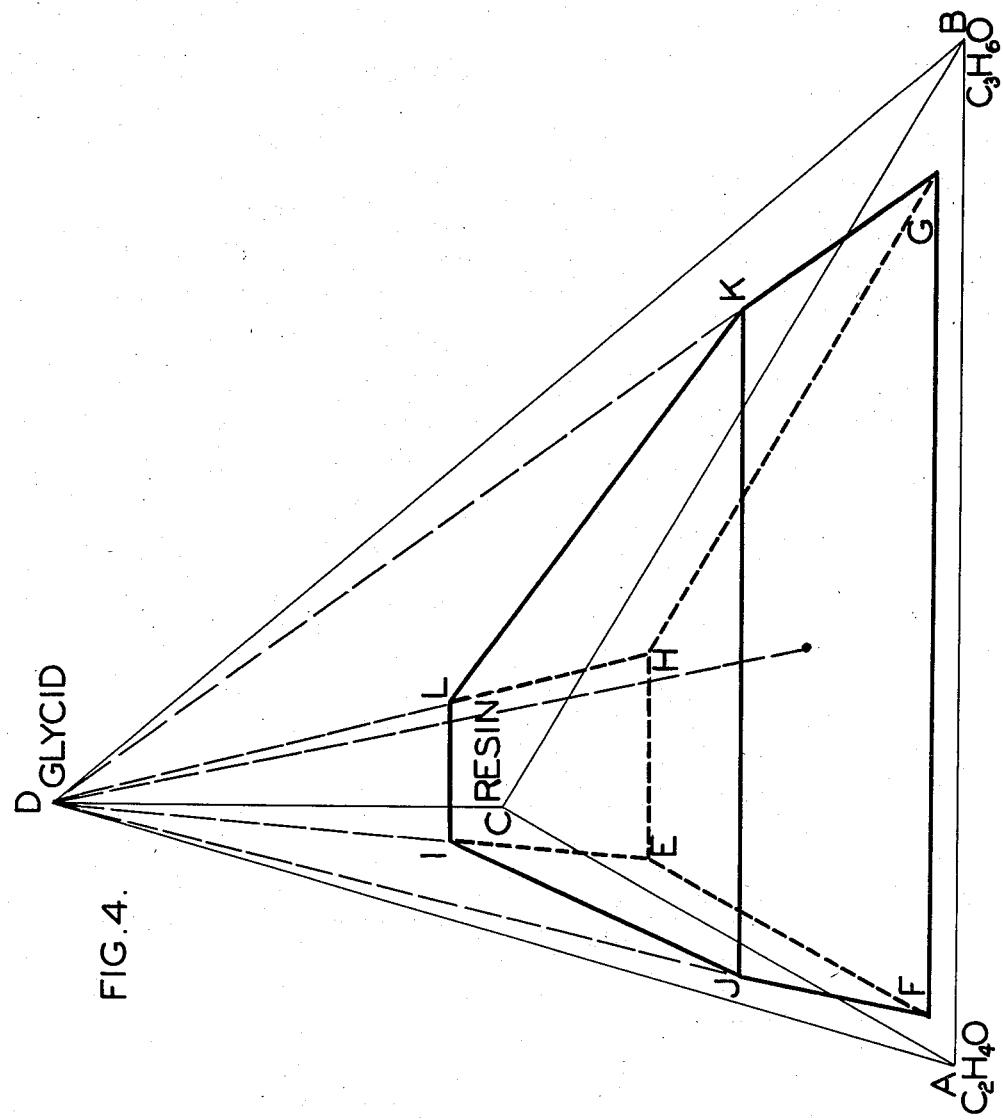

It is convenient to ignore temporarily Figure 3 and pass to Figure 4. Figure 4 again depicts the regular tetrahedron but actually is somewhat distorted, of course. It also shows a space or block within the tetrahedron and since the block is assumed to be somewhat above the base, each and every point in this block represents a 4-component system. The present invention is concerned with those compositions which are characterized and specified by this particular block. As stated previously if 3-dimensional models could be employed all that would be necessary would be to prepare the tetrahedron from sheets of plastic so that 100 sheets, for example would represent the distance between the base and the apex, cut out the space represented by the block, and fill it in with colored wax or another plastic, and thus the representation would be complete. This is not possible due to limitations which have been pointed out previously.

The composition represented by the block which is really a truncated trapezoidal pyramid is designated by E, F, G, H, I, J, K, and L. Bear in mind that, as has been stated, the base of the truncated pyramid, that is, E, F, G, and H, does not rest on the bottom of the equilateral base triangle. As has been pointed out previously, point D represents 100% glycide. The base triangle represents the three other components and obviously 0% glycide. For purpose of what is said herein, the lower base of the truncated pyramid, E, F, G, H, is a base parallel to the equilateral triangle but two units up, i. e., representing 2% of glycide. Similarly, the upper base of the truncated pyramid, I, J, K, L lies in a plane which is 25 units up from the base, to wit, represents 25% glycide. Specifically, then, this invention is concerned with the use of components in which the glycide component varies from 2% to 25% glycide. The problem then presented is the determination of the other three components, to wit, ethylene oxide, propylene oxide, and the hydrophobic reactant.

A simplification of the problem of characterizing a 4-component system which enters into the spirit of the present invention is this: If the amount of one component is determined or if a range is set, for example, 2% to 25% of glycide, then the difference between this amount and 100%, i. e., 75% to 98%, represents the amounts of percentages of the other three components combined, and these three components recalculated to 100% bases can be determined by use of an ordinary triangular graph, such as employed in our previously mentioned co-pending applications, Serial Nos. 129,707, and 129,708, filed November 28, 1949.

This becomes even simpler by reference to Figure 1 in which it will be assumed that the amount of glycide is within the range of 2% to 25%, and since the base of the tetrahedron is an equilateral triangle the plane parallel to the base and through any point on the perpendicular which represents 2% to 25%, must also be an equilateral triangle.

In Figure 1 from the point A' there are the three conventional perpendiculars to the sides as employed in a 4-component system, i. e., A'B', A'C', A'D'; however, by definition the lines A'B', A'C', and A'D' must be perpendicular to the faces. This means that the angles G'D'A, A'C'F, and A'B'E', are right angles. Similarly, the angles D'G'A, A'E'B', and A'F'C' represent the angles between the faces of a regular tetrahedron and thus are constant. Since two angles of the triangle are the same, the third angle must be the same and it means that these three triangles are similar. This means that the ratio between the perpendiculars to the sides, that is, A'B', A'C', and A'D' bear the same ratio to each other as the perpendiculars to the edges bear to each other to wit, A'E', A'F', and A'G'. Therefore, when the fourth component, for example, glycide, has been set within the range 2% to 25%, the remaining three components consisting of 75% to 98% recalculated back to 100% bases, can be calculated or represented by the same triangular graph as is conventional and as employed in the above mentioned co-pending applications, Serial Nos. 129,707 and 129,708, filed November 28, 1949.

Actually, as far as the limiting points in the truncated pyramid are concerned, which has been previously referred to in Figure 4, it will be noted that in the subsequent text there is a complete table giving the composition of these points for each successive range of glycide. In other words, a perfectly satisfactory repetition is available by means of these tables from a practical standpoint without necessarily resorting to the data of Figure 3.

Figure 3 shows a triangle and the three components other than glycide. These three components added together are less than 100%, to wit, 75% to 90%, but for reasons explained are calculated back to 100%. This point is clarified subsequently by examination of the tables. It will be noted also that in Figure 3 there is shown not only a trapezoid but in essence a trapezoid with a number of additional lines forming other trapezoids or triangles as indicated. The largest trapezoid is 1, 2, 3, 4. Within this tetrahedral area there are compounds whose compositions are indicated approximately by the parallelogram 3, 7, 5, 6. Likewise, another class is indicated by the fact that the compositions fall within the tetrahedral area defined approximately by points 5, 8, 9, 6. See substantially the same presentation as it appears in our co-pending applications, Serial Nos. 129,707 and 129,708, filed November 28, 1949.

Previous reference has been made to our co-pending applications, Serial Nos. 129,707, and 129,708, filed November 28, 1949. As stated, these were concerned with products or co-generic mixtures obtained from three components—an oxyalkylation - susceptible hydrophobic reactant, ethylene oxide and propylene oxide. The present invention contains the fourth component, glycide. At first glance it may seem rather odd that the introduction of glycide in even relatively small amounts radically affects the nature of the resultant products.

Comparing ethylene oxide, propylene oxide, and glycide, it is to be noted that in ethylene oxide the ratio of carbon atoms to oxygen is 2 to 1, in propylene oxide 3 to 1, and in glycide 1.5 to 1. This carbon-oxygen ratio, of course, explains the greater solidifying effect of glycide in comparison with either ethylene oxide or propylene oxide but the principal difference is that in using glycide one can obtain a variety of branched chain or forked structures.

Assume that the hydrophobic oxyalkylation-susceptible reactant has one or more terminal groups which may be indicated thus:

R simply represents a divalent radical. Reaction with ethylene oxide, propylene oxide and glycide may be shown thus:

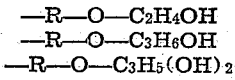

If one employs ethylene oxide first and then glycide, or propylene oxide first and then glycide, one obtains an increased hydrophile effect at the terminal groups for the reason there are two hydroxyls present instead of one, which additionally are susceptible to more complex micellar formation by virtue of association involving two hydroxyls. This is illustrated in the following manner:

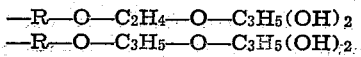

It becomes obvious that glycide can be employed in a number of ways, three of which are as follows: (a) immediately and preceding the introduction of either ethylene oxide or propylene oxide; (b) after ethylene oxide has been introduced and before propylene oxide has been introduced, or vice versa; after propylene oxide has been introduced and before ethylene oxide has been introduced; and finally (c) glycide can be introduced in a terminal position after both ethylene oxide and propylene oxide have been introduced. Needless to say, glycide could be introduced in all three of these positions, or in two of the three. For that matter some ethylene oxide can be introduced, then glycide, and more ethylene oxide, or some propylene oxide, then glycide and more propylene oxide.

Suggestive of such variations are the following formulas:

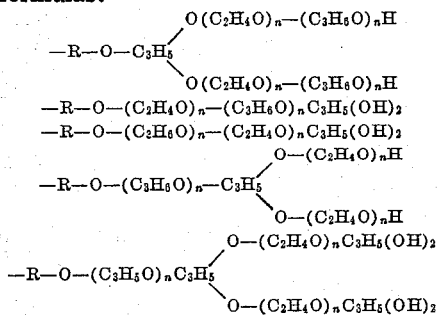

For sake of simplicity it appears advisable to present mixtures obtained from three components first (the oxyalkylation-susceptible hydrophobic reactant, ethylene oxide and propylene oxide) and then carry the three-component system into the four-component system by after-treatment with glycide within the stipulated proportions. After such description it becomes obvious that other modifications of the kind previously suggested readily present themselves and need only minor description. For this reason the subject matter immediately following is in substantially verbatim form as it appears in our co-pending applications, Serial Nos. 129,707, and 129,708, filed November 28, 1949.

PART 2

The phenol-aldehyde resins which are used as intermediates for the production of the products of the present invention are described in detail in Patent 2,499,370 with the qualification that the resins described in that patent are derived from difunctional phenols in which the phenol has a hydrocarbon substituent having from 4 to 12 carbon atoms. We have found that equally useful products are obtained from phenols having a substituent containing 14 carbon atoms. Therefore, reference is made to Patent 2,499,370 for a description of the resins and to Examples 1a through 103a of that patent for specific examples of suitable resins.

In addition, we point out that difunctional tetradecyl phenols are available at an attractive price. One grade of these particular phenols consists of a mixture representing about 90% para-substituted phenol, 5% ortho substituted phenol, and 5% meta-substituted phenol. Although the amount of meta substituent is comparatively large compared with other difunctional phenols it appears unobjectionable due to the comparatively large side chain. For example, compare with the preparation of soluble thermoplastic phenols from cardanol, or side chain hydrogenated cardanol. The grade of this material is manufactured by the Oronite Chemical Company and designated as tetradecyl phenol, grade 14-6069P. We have prepared resins from such phenol alone or in admixture following the same procedure described in specific examples preceding. As a specific example we have substituted 290 grams of this particular tetradecyl phenol in Examples 99a, 100a, and 101a, of Patent 2,499,370, and have obtained products having similar characteristics except that, if anything, the resins were somewhat darker and somewhat more fluid. Similarly, tetradecyl phenol can be used in combination with the other aldehydes described and will, for practical purposes, act very similarly to dodecyl phenol.

In our Patent 2,557,081 we describe the treatment of resins of this character with both propylene oxide and ethylene oxide to produce oxyalkylated products which are useful themselves as demulsifying agents and are useful for preparing products of the present invention by treatment with glycide, and reference is made to that patent for specific examples of phenol-aldehyde resins which have been treated with both propylene oxide and ethylene oxide and are useful as intermediates for preparing products of the present invention.

PART 3

As has been pointed out previously, one way of preparing compounds or cogeneric mixtures to be used in the present invention is to prepare a series of compounds such as those indicated by Examples A through I or more specifically the series identified as XAA1 through XFF1, or the series YAA1 through YFF1, or the series ZAA1 through ZFF1, of Patent 2,557,081.

Having prepared such series all that needs to be done thereafter is to treat such oxyalkylated derivatives with glycide so that the percentage of glycide based on the total four-component reaction mass represents 2% to 25% by weight. Such procedure, however, has the obvious limitation that the glycide radical or radicals can appear in the terminal position only.

Referring now to Figure 4 it is obvious that the three components (ignoring glycide) are represented by either the lower trapezoidal base in Figure 4, i. e., E, F, G, H or I, J, K, L, and then recalculated to 100% basis as a tertiary mixture; such three components must lie within the trapezoid 1, 2, 3, 4 in Figure 3, and the preferred proportions are within the parallel 3, 7, 5, 6.

Stated another way, if one selects the proportion of three components or reactants (ignoring glycide), and at any stage employs sufficient glycide so that on the basis of the quaternary mixture such glycide represents 2% to 25% of the total by weight, then and in that event one has automatically obtained a composition that is within the limits of the truncated trapezoidal pyramid identified as E, F, G, H—I, J, K, L in Figure 4. This represents the cogeneric mixture or reaction product in terms of initial reactants with the proviso that the glycide content is 2% to 25% by weight, and that the remaining three components recalculated to 100% basis (leaving out glycide for the moment) come within the trapezoidal area indicated by 1, 2, 3, 4 on the triangular graph, to wit, Figure 3.

We have prepared derivatives of the kind herein described in a scale varying from a few hundred grams or less, in the laboratory to hundreds of pounds on a plant scale. In preparing a large number of examples we have found it particularly advantageous to use laboratory equipment which permits continuous oxypropylation and oxyethylation. More specific reference will be made to treatment with glycide, subsequently in the text. The oxyethylation step is, of course, the same as the oxypropylation step insofar that two low boiling liquids are handled in each instance. What immediately follows refers to oxypropylation and it is understood that oxyethylation can be handled conveniently in exactly the same way.

The oxypropylation procedure employed in the preparation of derivatives from polyhydric reactants has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at least one connection for conducting the incoming alkylene oxide, such as propylene oxide, to the bottom of the autoclave; along with suitable devices for both cooling and heating the autoclave, such as a cooling jacket and, preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxalkylation procedures.

Continuous operation, or substantially continuous operation, is achieved by the use of a separate container to hold the alkylene oxide being employed, particularly propylene oxide. The container consists essentially of a laboratory bomb having a capacity of about one-half gallon, or somewhat in excess thereof. This bomb was equipped, also, with an inlet for charging, and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing so that continuous weighings could be made without breaking or making any connections. This also applied to the nitrogen line, which was used to pressure the bomb reservoir. To the extend that it was required, any other usual conventional procedure or addition which provided greater safety was used, of course, such as safety glass, protective screens, etc.

With this particular arrangement practically all oxypropylations became uniform in that the reaction temperature could be held within a few degrees of any point selected in this particular range; for instance, in most cases we have selected a point of approximately 160° C. to 165° C., as being particularly desirable and stayed within the range of 155° to 180° C. almost invariably. The propylene oxide was forced in by means of nitrogen pressure as rapidly as it was absorbed, as indicated by the pressure gauge in the autoclave. In case the reaction slowed up so the temperature dropped much below the selected point of reaction, for instance, 160° C., then all that was required was that either cooling water was cut down or steam was employed, or the addition of propylene oxide speeded up, or electric heat used in addition to the steam in order that the reaction procedures at or near the selected temperatures be maintained.

Inversely, if the reaction proceeded too fast the amount of reactant being added, i. e., propylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional and, as far as we are aware, can be furnished by at least two firms who specialize in the manufacture of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities are difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in the preparation of Example 1a in Part 2, and offered for sale by numerous laboratory supply houses. If such arrangement is used to prepare laboratory scale duplications, then care should be taken that the heating mantle can be removed rapidly so as to allow for cooling; or better still, through an added opening at the top the glass resin pot or comparable vessel should be equipped with a stainless steel cooling coil so that the pot can be cooled more rapidly than mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind previously described in this part; but in any event, when the initial amount of glycide is added to a suitable reactant, such as sorbitol, the speed of reaction should be controlled by the usual factors, such as (a) the addition of glycide; (b) the elimination of external heat, and (c) use of cooling coil so there is no undue rise in temperature. All the foregoing is merely conventional but is included due to the hazard in handling glycide.

*Example 1b*

It is to be noted that the procedure followed can be conducted on any convenient scale, that is, on either a small laboratory scale, semi-pilot plant scale, pilot plant scale, or large plant scale. We have conducted experiments employing equipment of all such various sizes. Our preference even on a laboratory scale is to use continuous introduction of ethylene and propylene oxide, although this is not necessary. The introduction may be batchwise. Previous reference has been made to the catalyst used in connection with ethylene oxide and propylene oxide. These same alkaline catalysts, particularly caustic soda, caustic potash, sodium methylate, etc., are equally satisfactory with glycide which in many ways seems to be at least as reactive as ethylene oxide and possibly more reactive than propylene oxide.

The reaction vessel employed was a stainless steel autoclave with the usual devices for heating, heat control, stirrer, inlet, outlet, etc., which is conventional in this type of apparatus. The capacity was approximately 40 gallons. The stirrer operated at a speed of approximately 250 R. P. M.

The particular piece of equipment employed was adapted for the use of glycide without pressure, as well as the use of ethylene oxide and propylene oxide with pressure. Stated another way, instead of serving as an autoclave only it was also equipped with a water-cooled condenser which could be shut off when used as an autoclave. It was equipped also with an equivalent of a separatory funnel and an equalizing pressure tube so that a liquid such as glycide could be fed continuously at a dropwise or faster rate into the vessel and the rate controlled by visual examination. For convenience, this piece of equipment will be referred to as an autoclave.

12.5 pounds of amylphenol-formaldehyde resin were dissolved in 12.5 pounds of xylene so as to produce a solution representing 50% of resin by weight. This was charged into the autoclave. There were added approximately 10 ounces (approximately 5% by weight) of ground caustic soda. After being charged the autoclave was sealed, swept with nitrogen, stirring started immediately and heat applied. The temperature was allowed to rise to approximately 118° C.

The glycide employed was comparatively pure. 2.5 pounds of glycide were used. This was charged into the upper reservoir vessel which has been previously flushed out with nitrogen and was the equivalent of a separatory funnel. The glycide was started slowly into the reaction mass in a stream. Reaction started to take place immediately and the temperature rose approximately 12° to 13°. Cooling water was run through the coils so the temperature for addition of glycide was controlled within the range roughly of 110° to 130° C. The addition was continuous within limitations and all the glycide was added in less than 45 minutes. This reaction took place at atmospheric pressure with simply a small stream of nitrogen passing into the autoclave at the very top and passing out the open condenser so as to avoid any possible entrance of air. When the reaction was complete this condenser was shut off and also the opening to the glycide inlet and to the equalizing line. The equipment was used as an autoclave during the addition of propylene oxide and ethylene oxide. In other words, the equipment was operated under pressure. At this point the addition of propylene oxide was started. It was added continuously at such speed that it was absorbed by the reaction as rapidly as possible. The amount of propylene oxide added was 8.4 pounds. The time required to add this propylene oxide was less than one hour. During this time the temperature was maintained at 155° to 162.5° C., using cooling water through the inner coils when necessary, and otherwise applying heat if required. At the end of the addition of propylene oxide there was added ethylene oxide as previously indicated. The amount of ethylene oxide added was 6.5 pounds. The temperature employed, and operating conditions, were the same as with the addition of propylene oxide. It is to be noted, however, that ethylene oxide appears to be more reactive and the reaction seems to require a greater amount of cooling water to hold the temperature range indicated. The time required to add the ethylene oxide was less than an hour.

During the addition of the propylene and ethylene oxides, the pressure was held at approximately 50 pounds per square inch gauge pressure, or less. When all the oxide had been added (ethylene oxide being the final addition in this particular instance) the autoclave was permitted to stay at the same temperature range for another half hour, even longer if required, or until the gauge pressure had been reduced to zero or substantially zero, indicating the reaction was complete. The final product when freed from xylene by vacuum distillation was an oily material, somewhat viscous in nature, resembling castor oil. It was somewhat dispersible in water and also soluble in non-aqueous solvents, such as aromatic hydrocarbons, and others, although not soluble in some non-polar hydrocarbon solvents. The final yield was substantially the total weight of the initial reactants.

*Example 2b*

The same procedure was followed as in Example 1b, preceding, except that the order of addition of the oxides was reversed, the ethylene oxide being added first and the propylene oxide last. The time period, temperature range, pressure, etc., were kept the same as in Example 1b, preceding.

*Example 3b*

The same ratios were used, and the same procedure was followed as in Example 1b, but with the following difference; the equipment was used first as an autoclave to add the propylene oxide. All the propylene oxide was added, the condenser was open to atmospheric pressure, a slow stream of nitrogen was passed through the equipment to prevent air from coming in contact with the reaction mass, and then the same amount of glycide was added as in Example 1b, as the second alkylene oxide reactant instead of the first. When all the glycide had been added in approximately a 2-hour period of time, the connections were changed so that the ethylene oxide was added. The amounts employed, operating conditions, etc., were the same as in Example 1b.

*Example 4b*

The same procedure was followed as in Example 3b, preceding except that the stages of addition of ethylene oxide and propylene oxide were reversed, that is, the ethylene oxide was added as the first stage, using the equipment as an autoclave, then the glycide was added, and then the propylene oxide. The amounts used, operating conditions, etc., were identically the same as in Example 1b, preceding, except for the order of addition.

*Example 5b*

The co-generic mixture obtained from Example XAA1 of Patent 2,557,081 was treated with 1.3 pounds of glycide in the manner described in Example 1b, preceding. It is to be noted that in essence this is simply another variation of Example 1b, in which the equipment is used as an autoclave, first to add the propylene oxide and then to add the ethylene oxide, and then the glycide when using the equipment with a condenser open to the atmosphere with a slow stream of nitrogen passing through to prevent entrance of air.

*Example 6b*

The product obtained from Example XBB1 of Patent 2,557,081 was treated with 1.1 pounds of glycide in the manner described in Example 1b, preceding. It is to be noted that this example again is simply a variation of Example 1b, in which the ethylene oxide was added first and then the propylene oxide. During these two additions the equipment was used as an autoclave and then the customary change made and glycide added to the extent of 1.1 pounds in the manner described in Example 1b, preceding.

Example 7b

The same procedure was followed as in Example 1b with the following change. After the glycide was added the propylene oxide and ethylene oxide were added as a mixture (14.9 pounds). This mixture of ethylene oxide and propylene oxide was obtained from 8.4 pounds of propylene oxide and 6.5 pounds of ethylene oxide. In this instance, again, the time range, temperature, and pressure were kept substantially the same as in Example 1b, preceding.

Example 8b

The product obtained from Example XCC1 described in Patent 2,557,081 was treated with .9 pound of glycide in the manner previously described under the heading of Example 1b. The procedure employed was that described in Example 5b, preceding.

Example 9b

The examples previously described as Examples 1b, through 8b, inclusive, were repeated making the following change. The amount of catalyst added, instead of being 10 ounces was increased to 11.5 ounces. The amount of glycide used was doubled in each instance. The conditions under which the glycide was added were the same as in previous examples but required slightly longer for addition.

Example 10b

The same procedure was employed as in Examples 1b through 8b, preceding, except that where XAA1, XBB1 and XCC1 were employed, there were used instead the analogous compounds YAA1, YBB1, and YCC1, described in Patent 2,557,081.

Example 11b

The same procedure was employed as in Examples 1b through 8b, preceding, except that where XAA1, XBB1 and XCC1 were employed, there were used instead the analogous compounds ZAA1, ZBB1, and ZCC1, described in Patent 2,557,081.

It is to be noted that all the previous examples were prepared from a single resin only, to wit, a tertiary amylphenol formaldehyde resin. Needless to say, the same phenol could have been combined with numerous other aldehydes described, or a different phenol could have been used. Under the circumstances it would have been impossible within a reasonable length of time to produce each and every compound herein included and specified as part of the invention. The reasons are obvious. However, we have prepared the equivalent of Example 1b, preceding, in respect to a spot check on a large number of resins and are showing them in the following table. In each instance the amount of glycide varied from 1% to 25% so as to cover the glycide range and the resins employed are indicated in the table. Some additional examples were also prepared, as follows:

| Per Cent Glycide | Amyl Formald. | Butyl Formald. | Octyl Formald. | Nonyl Formald. | Menthyl Formald. | Amylphenol-Acetaldehyde Resin | Butyl Propion-Aldehyde Resin | Octyl Phenol Fufural Resin | Nonyl Phenol Hept-aldehyde Resin | Menthyl Butyral Aldehyde Resin |
|---|---|---|---|---|---|---|---|---|---|---|
| 1 | X | | | | | X | | | | |
| 2 | | X | | | | | X | | | |
| 3 | | | X | | | | | X | | |
| 4 | | | | X | | | | | X | |
| 5 | | | | | X | | | | | X |
| 6 | X | | | | | X | | | | |
| 7 | | X | | | | | X | | | |
| 8 | | | X | | | | | X | | |
| 9 | | | | X | | | | | X | |
| 10 | | | | | X | | | | | X |
| 11 | X | | | | | X | | | | |
| 12 | | X | | | | | X | | | |
| 13 | | | X | | | | | X | | |
| 14 | | | | X | | | | | X | |
| 15 | | | | | X | | | | | X |
| 16 | X | | | | | X | | | | |
| 17 | | X | | | | | X | | | |
| 18 | | | X | | | | | X | | |
| 19 | | | | X | | | | | X | |
| 20 | | | | | X | | | | | X |
| 21 | X | | | | | | X | | | |
| 22 | | X | | | | | | X | | |
| 23 | | | X | | | | | | X | |
| 24 | | | | X | | | | | X | |
| 25 | | | | | X | | | | | X |

Incidentally, the physical appearance of the materials obtained using glycide in addition to ethylene oxide and propylene oxide is substantially the same as those obtained in which glycide is not used. There is no marked difference in physical appearance and glycide does, of course, add a greater proportion of water solubility. Needless to say, visual examination, or simple physical tests do not reveal the differences in structure pointed out in Part 1. These polyglycol ethers are comparatively thin liquids, sometimes showing only modest viscosity, and the color varies from almost water-white to pale amber. The color seems to be due to impurities such as a trace of iron getting into the compound during the process of manufacture, or may be present in the catalyst. The products, of course, show a considerable range of insolubility, from a stage where they are dispersible or miscible, to products which, at least in dilute solution, have an apparently homogeneous or transparent appearance.

PART 4

Referring to Figure 3, it is apparent that although a number of examples have been included, and particular reference is made to Examples A through S, that there is a limit to the numbers which can be included without producing description which becomes burdensome in length. This applies to an even greater degree to the four-component system for the reason that one has included all points within the truncated tetrahedral pyramid depicted in Figure 4 and defined by E, F, G, H—I, J, K, L. However, for convenience, referring to the table which includes Examples A through I in Patent 2,557,081, it is to be noted that the initial mixture includes 6 parts of resin, 3 parts of ethylene oxide, and one part of propylene oxide. This corresponds to point 1 on the chart. In the final example, to wit, Example I, corresponding to point 4 on the chart, there are employed 6 pounds of resin, one pound of ethylene oxide and 3 pounds of propylene oxide. All the significant 9 points in Figure 3, corresponding to Examples A to I, inclusive in Patent 2,557,081, are shown in the following tables. The table shows the mixture with the three-component constituent (when recalculated back to 100% basis) and the corresponding figure when 1% to 25% glycide is present. The tables are self-explanatory and illustrate compositions which set the boundary or limiting compositions. We have spot checked such compositions and prepared a substantial number but are not including them for the reason that such inclusion would be only repetitious over and above what has been said previously.

TABLE A

Table for Ex. A Series—Point 1 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 60 | 30 | 10 | 59.4 | 29.7 | 9.9 |
| 2 | 98 | 60 | 30 | 10 | 58.8 | 29.4 | 9.8 |
| 3 | 97 | 60 | 30 | 10 | 58.2 | 29.1 | 9.7 |
| 4 | 96 | 60 | 30 | 10 | 57.6 | 28.8 | 9.6 |
| 5 | 95 | 60 | 30 | 10 | 57.0 | 28.5 | 9.5 |
| 6 | 94 | 60 | 30 | 10 | 56.4 | 28.2 | 9.4 |
| 7 | 93 | 60 | 30 | 10 | 55.8 | 27.9 | 9.3 |
| 8 | 92 | 60 | 30 | 10 | 55.2 | 27.6 | 9.2 |
| 9 | 91 | 60 | 30 | 10 | 54.6 | 27.3 | 9.1 |
| 10 | 90 | 60 | 30 | 10 | 54.0 | 27.0 | 9.0 |
| 11 | 89 | 60 | 30 | 10 | 53.4 | 26.7 | 8.9 |
| 12 | 88 | 60 | 30 | 10 | 52.8 | 26.4 | 8.8 |
| 13 | 87 | 60 | 30 | 10 | 52.2 | 26.1 | 8.7 |
| 14 | 86 | 60 | 30 | 10 | 51.6 | 25.8 | 8.6 |
| 15 | 85 | 60 | 30 | 10 | 51.0 | 25.5 | 8.5 |
| 16 | 84 | 60 | 30 | 10 | 50.4 | 25.2 | 8.4 |
| 17 | 83 | 60 | 30 | 10 | 49.8 | 24.9 | 8.3 |
| 18 | 82 | 60 | 30 | 10 | 49.2 | 24.6 | 8.2 |
| 19 | 81 | 60 | 30 | 10 | 48.6 | 24.3 | 8.1 |
| 20 | 80 | 60 | 30 | 10 | 48.0 | 24.0 | 8.0 |
| 21 | 79 | 60 | 30 | 10 | 47.4 | 23.7 | 7.9 |
| 22 | 78 | 60 | 30 | 10 | 46.8 | 23.4 | 7.8 |
| 23 | 77 | 60 | 30 | 10 | 46.2 | 23.1 | 7.7 |
| 24 | 76 | 60 | 30 | 10 | 45.6 | 22.8 | 7.6 |
| 25 | 75 | 60 | 30 | 10 | 45.0 | 22.5 | 7.5 |

TABLE B

Table for Ex. B Series—Point 5 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 50 | 40 | 10 | 49.5 | 39.6 | 9.9 |
| 2 | 98 | 50 | 40 | 10 | 49.0 | 39.2 | 9.8 |
| 3 | 97 | 50 | 40 | 10 | 48.5 | 38.8 | 9.7 |
| 4 | 96 | 50 | 40 | 10 | 48.0 | 38.4 | 9.6 |
| 5 | 95 | 50 | 40 | 10 | 47.5 | 38.0 | 9.5 |
| 6 | 94 | 50 | 40 | 10 | 47.0 | 37.6 | 9.4 |
| 7 | 93 | 50 | 40 | 10 | 46.5 | 37.2 | 9.3 |
| 8 | 92 | 50 | 40 | 10 | 46.0 | 36.8 | 9.2 |
| 9 | 91 | 50 | 40 | 10 | 45.5 | 36.4 | 9.1 |
| 10 | 90 | 50 | 40 | 10 | 45.0 | 36.0 | 9.0 |
| 11 | 89 | 50 | 40 | 10 | 44.5 | 35.6 | 8.9 |
| 12 | 88 | 50 | 40 | 10 | 44.0 | 35.2 | 8.8 |
| 13 | 87 | 50 | 40 | 10 | 43.5 | 34.8 | 8.7 |
| 14 | 86 | 50 | 40 | 10 | 43.0 | 34.4 | 8.6 |
| 15 | 85 | 50 | 40 | 10 | 42.5 | 34.0 | 8.5 |
| 16 | 84 | 50 | 40 | 10 | 42.0 | 33.6 | 8.4 |
| 17 | 83 | 50 | 40 | 10 | 41.5 | 33.2 | 8.3 |
| 18 | 82 | 50 | 40 | 10 | 41.0 | 32.8 | 8.2 |
| 19 | 81 | 50 | 40 | 10 | 40.5 | 32.4 | 8.1 |
| 20 | 80 | 50 | 40 | 10 | 40.0 | 32.0 | 8.0 |

TABLE B—Continued

Table for Ex. B Series—Point 5 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 21 | 79 | 50 | 40 | 10 | 39.5 | 31.6 | 7.9 |
| 22 | 78 | 50 | 40 | 10 | 39.0 | 31.2 | 7.8 |
| 23 | 77 | 50 | 40 | 10 | 38.5 | 30.8 | 7.7 |
| 24 | 76 | 50 | 40 | 10 | 38.0 | 30.4 | 7.6 |
| 25 | 75 | 50 | 40 | 10 | 37.5 | 30.0 | 7.5 |

TABLE C

Table for Ex. C Series—Point 8 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 30 | 60 | 10 | 29.7 | 59.4 | 9.9 |
| 2 | 98 | 30 | 60 | 10 | 29.4 | 58.8 | 9.8 |
| 3 | 97 | 30 | 60 | 10 | 29.1 | 58.2 | 9.7 |
| 4 | 96 | 30 | 60 | 10 | 28.8 | 57.6 | 9.6 |
| 5 | 95 | 30 | 60 | 10 | 28.5 | 57.0 | 9.5 |
| 6 | 94 | 30 | 60 | 10 | 28.2 | 56.4 | 9.4 |
| 7 | 93 | 30 | 60 | 10 | 27.9 | 55.8 | 9.3 |
| 8 | 92 | 30 | 60 | 10 | 27.6 | 55.2 | 9.2 |
| 9 | 91 | 30 | 60 | 10 | 27.3 | 54.6 | 9.1 |
| 10 | 90 | 30 | 60 | 10 | 27.0 | 54.0 | 9.0 |
| 11 | 89 | 30 | 60 | 10 | 26.7 | 53.4 | 8.9 |
| 12 | 88 | 30 | 60 | 10 | 26.4 | 52.8 | 8.8 |
| 13 | 87 | 30 | 60 | 10 | 26.1 | 52.2 | 8.7 |
| 14 | 86 | 30 | 60 | 10 | 25.8 | 51.6 | 8.6 |
| 15 | 85 | 30 | 60 | 10 | 25.5 | 51.0 | 8.5 |
| 16 | 84 | 30 | 60 | 10 | 25.2 | 50.4 | 8.4 |
| 17 | 83 | 30 | 60 | 10 | 24.9 | 49.8 | 8.3 |
| 18 | 82 | 30 | 60 | 10 | 24.6 | 49.2 | 8.2 |
| 19 | 81 | 30 | 60 | 10 | 24.3 | 48.6 | 8.1 |
| 20 | 80 | 30 | 60 | 10 | 24.0 | 48.0 | 8.0 |
| 21 | 79 | 30 | 60 | 10 | 23.7 | 47.4 | 7.9 |
| 22 | 78 | 30 | 60 | 10 | 23.4 | 46.8 | 7.8 |
| 23 | 77 | 30 | 60 | 10 | 23.1 | 46.2 | 7.7 |
| 24 | 76 | 30 | 60 | 10 | 22.8 | 45.6 | 7.6 |
| 25 | 75 | 30 | 60 | 10 | 22.5 | 45.0 | 7.5 |

TABLE D

Table for Ex. D Series—Point 2 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 4 | 86 | 10 | 4.0 | 85.1 | 9.9 |
| 2 | 98 | 4 | 86 | 10 | 3.9 | 84.3 | 9.8 |
| 3 | 97 | 4 | 86 | 10 | 3.9 | 83.4 | 9.7 |
| 4 | 96 | 4 | 86 | 10 | 3.8 | 82.6 | 9.6 |
| 5 | 95 | 4 | 86 | 10 | 3.8 | 81.7 | 9.5 |
| 6 | 94 | 4 | 86 | 10 | 3.8 | 80.8 | 9.4 |
| 7 | 93 | 4 | 86 | 10 | 3.7 | 80.0 | 9.3 |
| 8 | 92 | 4 | 86 | 10 | 3.7 | 79.1 | 9.2 |
| 9 | 91 | 4 | 86 | 10 | 3.6 | 78.3 | 9.1 |
| 10 | 90 | 4 | 86 | 10 | 3.6 | 77.4 | 9.0 |
| 11 | 89 | 4 | 86 | 10 | 3.6 | 76.5 | 8.9 |
| 12 | 88 | 4 | 86 | 10 | 3.5 | 75.7 | 8.8 |
| 13 | 87 | 4 | 86 | 10 | 3.5 | 74.8 | 8.7 |
| 14 | 86 | 4 | 86 | 10 | 3.4 | 74.0 | 8.6 |
| 15 | 85 | 4 | 86 | 10 | 3.4 | 73.1 | 8.5 |
| 16 | 84 | 4 | 86 | 10 | 3.4 | 72.2 | 8.4 |
| 17 | 83 | 4 | 86 | 10 | 3.3 | 71.4 | 8.3 |
| 18 | 82 | 4 | 86 | 10 | 3.3 | 70.5 | 8.2 |
| 19 | 81 | 4 | 86 | 10 | 3.2 | 69.7 | 8.1 |
| 20 | 80 | 4 | 86 | 10 | 3.2 | 68.8 | 8.0 |
| 21 | 79 | 4 | 86 | 10 | 3.2 | 67.9 | 7.9 |
| 22 | 78 | 4 | 86 | 10 | 3.1 | 67.1 | 7.8 |
| 23 | 77 | 4 | 86 | 10 | 3.1 | 66.2 | 7.7 |
| 24 | 76 | 4 | 86 | 10 | 3.0 | 65.4 | 7.6 |
| 25 | 75 | 4 | 86 | 10 | 3.0 | 64.5 | 7.5 |

TABLE E

Table for Ex. E Series—Point 9 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 4 | 60 | 36 | 4.0 | 59.4 | 35.6 |
| 2 | 98 | 4 | 60 | 36 | 3.9 | 58.8 | 35.3 |
| 3 | 97 | 4 | 60 | 36 | 3.9 | 58.2 | 34.9 |
| 4 | 96 | 4 | 60 | 36 | 3.8 | 57.6 | 34.6 |
| 5 | 95 | 4 | 60 | 36 | 3.8 | 57.0 | 34.2 |
| 6 | 94 | 4 | 60 | 36 | 3.8 | 56.4 | 33.8 |
| 7 | 93 | 4 | 60 | 36 | 3.7 | 55.8 | 33.5 |
| 8 | 92 | 4 | 60 | 36 | 3.7 | 55.2 | 33.1 |
| 9 | 91 | 4 | 60 | 36 | 3.6 | 54.6 | 32.8 |
| 10 | 90 | 4 | 60 | 36 | 3.6 | 54.0 | 32.4 |
| 11 | 89 | 4 | 60 | 36 | 3.6 | 53.4 | 32.0 |
| 12 | 88 | 4 | 60 | 36 | 3.5 | 52.8 | 31.7 |
| 13 | 87 | 4 | 60 | 36 | 3.5 | 52.2 | 31.3 |
| 14 | 86 | 4 | 60 | 36 | 3.4 | 51.6 | 31.0 |
| 15 | 85 | 4 | 60 | 36 | 3.4 | 51.0 | 30.6 |
| 16 | 84 | 4 | 60 | 36 | 3.4 | 50.4 | 30.2 |
| 17 | 83 | 4 | 60 | 36 | 3.3 | 49.8 | 29.9 |
| 18 | 82 | 4 | 60 | 36 | 3.3 | 49.2 | 29.5 |
| 19 | 81 | 4 | 60 | 36 | 3.2 | 48.6 | 29.2 |
| 20 | 80 | 4 | 60 | 36 | 3.2 | 48.0 | 28.8 |
| 21 | 79 | 4 | 60 | 36 | 3.2 | 47.4 | 28.4 |
| 22 | 78 | 4 | 60 | 36 | 3.1 | 46.8 | 28.1 |
| 23 | 77 | 4 | 60 | 36 | 3.1 | 46.2 | 27.7 |
| 24 | 76 | 4 | 60 | 36 | 3.0 | 45.6 | 27.4 |
| 25 | 75 | 4 | 60 | 36 | 3.0 | 45.0 | 27.0 |

TABLE F

Table for Ex. F Series—Point 6 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 4 | 40 | 56 | 4.0 | 39.6 | 55.4 |
| 2 | 98 | 4 | 40 | 56 | 3.9 | 39.2 | 54.9 |
| 3 | 97 | 4 | 40 | 56 | 3.9 | 38.8 | 54.3 |
| 4 | 96 | 4 | 40 | 56 | 3.8 | 38.4 | 53.8 |
| 5 | 95 | 4 | 40 | 56 | 3.8 | 38.0 | 53.2 |
| 6 | 94 | 4 | 40 | 56 | 3.8 | 37.6 | 52.6 |
| 7 | 93 | 4 | 40 | 56 | 3.7 | 37.2 | 52.1 |
| 8 | 92 | 4 | 40 | 56 | 3.7 | 36.8 | 51.5 |
| 9 | 91 | 4 | 40 | 56 | 3.6 | 36.4 | 51.0 |
| 10 | 90 | 4 | 40 | 56 | 3.6 | 36.0 | 50.4 |
| 11 | 89 | 4 | 40 | 56 | 3.6 | 35.6 | 49.8 |
| 12 | 88 | 4 | 40 | 56 | 3.5 | 35.2 | 49.3 |
| 13 | 87 | 4 | 40 | 56 | 3.5 | 34.8 | 48.7 |
| 14 | 86 | 4 | 40 | 56 | 3.4 | 34.4 | 48.2 |
| 15 | 85 | 4 | 40 | 56 | 3.4 | 34.0 | 47.6 |
| 16 | 84 | 4 | 40 | 56 | 3.4 | 33.6 | 47.0 |
| 17 | 83 | 4 | 40 | 56 | 3.3 | 33.2 | 46.5 |
| 18 | 82 | 4 | 40 | 56 | 3.3 | 32.8 | 45.9 |
| 19 | 81 | 4 | 40 | 56 | 3.2 | 32.4 | 45.4 |
| 20 | 80 | 4 | 40 | 56 | 3.2 | 32.0 | 44.8 |
| 21 | 79 | 4 | 40 | 56 | 3.2 | 31.6 | 44.2 |
| 22 | 78 | 4 | 40 | 56 | 3.1 | 31.2 | 43.7 |
| 23 | 77 | 4 | 40 | 56 | 3.1 | 30.8 | 43.1 |
| 24 | 76 | 4 | 40 | 56 | 3.0 | 30.4 | 42.6 |
| 25 | 75 | 4 | 40 | 56 | 3.0 | 30.0 | 42.0 |

TABLE G

Table for Ex. G Series—Point 3 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 4 | 10 | 86 | 4.0 | 9.9 | 85.1 |
| 2 | 98 | 4 | 10 | 86 | 3.9 | 9.8 | 84.3 |
| 3 | 97 | 4 | 10 | 86 | 3.9 | 9.7 | 83.4 |
| 4 | 96 | 4 | 10 | 86 | 3.8 | 9.6 | 82.6 |
| 5 | 95 | 4 | 10 | 86 | 3.8 | 9.5 | 81.7 |
| 6 | 94 | 4 | 10 | 86 | 3.8 | 9.4 | 80.8 |
| 7 | 93 | 4 | 10 | 86 | 3.7 | 9.3 | 80.0 |
| 8 | 92 | 4 | 10 | 86 | 3.7 | 9.2 | 79.1 |
| 9 | 91 | 4 | 10 | 86 | 3.6 | 9.1 | 78.3 |
| 10 | 90 | 4 | 10 | 86 | 3.6 | 9.0 | 77.4 |
| 11 | 89 | 4 | 10 | 86 | 3.6 | 8.9 | 76.5 |
| 12 | 88 | 4 | 10 | 86 | 3.5 | 8.8 | 75.7 |
| 13 | 87 | 4 | 10 | 86 | 3.5 | 8.7 | 74.8 |
| 14 | 86 | 4 | 10 | 86 | 3.4 | 8.6 | 74.0 |
| 15 | 85 | 4 | 10 | 86 | 3.4 | 8.5 | 73.1 |
| 16 | 84 | 4 | 10 | 86 | 3.4 | 8.4 | 72.2 |
| 17 | 83 | 4 | 10 | 86 | 3.3 | 8.3 | 71.4 |
| 18 | 82 | 4 | 10 | 86 | 3.3 | 3.2 | 70.5 |
| 19 | 81 | 4 | 10 | 86 | 3.2 | 8.1 | 69.7 |
| 20 | 80 | 4 | 10 | 86 | 3.2 | 8.0 | 68.8 |
| 21 | 79 | 4 | 10 | 86 | 3.2 | 7.9 | 67.9 |
| 22 | 78 | 4 | 10 | 86 | 3.1 | 7.8 | 67.1 |
| 23 | 77 | 4 | 10 | 86 | 3.1 | 7.7 | 66.2 |
| 24 | 76 | 4 | 10 | 86 | 3.0 | 7.6 | 65.4 |
| 25 | 75 | 4 | 10 | 86 | 3.0 | 7.5 | 64.5 |

TABLE H

Table for Ex. H Series—Point 7 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 50 | 10 | 40 | 49.5 | 9.9 | 39.6 |
| 2 | 98 | 50 | 10 | 40 | 49.0 | 9.8 | 39.2 |
| 3 | 97 | 50 | 10 | 40 | 48.5 | 9.7 | 39.8 |
| 4 | 96 | 50 | 10 | 40 | 48.0 | 9.6 | 38.4 |
| 5 | 95 | 50 | 10 | 40 | 47.5 | 9.5 | 38.0 |
| 6 | 94 | 50 | 10 | 40 | 47.0 | 9.4 | 37.6 |
| 7 | 93 | 50 | 10 | 40 | 46.5 | 9.3 | 37.2 |
| 8 | 92 | 50 | 10 | 40 | 46.0 | 9.2 | 36.8 |
| 9 | 91 | 50 | 10 | 40 | 45.5 | 9.1 | 36.4 |
| 10 | 90 | 50 | 10 | 40 | 45.0 | 9.0 | 36.0 |
| 11 | 89 | 50 | 10 | 40 | 44.5 | 8.9 | 35.6 |
| 12 | 88 | 50 | 10 | 40 | 44.0 | 8.8 | 35.2 |
| 13 | 87 | 50 | 10 | 40 | 43.5 | 8.7 | 34.8 |
| 14 | 86 | 50 | 10 | 40 | 43.0 | 8.6 | 34.4 |
| 15 | 85 | 50 | 10 | 40 | 42.5 | 8.5 | 34.0 |
| 16 | 84 | 50 | 10 | 40 | 42.0 | 8.4 | 33.6 |
| 17 | 83 | 50 | 10 | 40 | 41.5 | 8.3 | 33.2 |
| 18 | 82 | 50 | 10 | 40 | 41.0 | 8.2 | 32.8 |
| 19 | 81 | 50 | 10 | 40 | 40.5 | 8.1 | 32.4 |
| 20 | 80 | 50 | 10 | 40 | 40.0 | 8.0 | 32.0 |
| 21 | 79 | 50 | 10 | 40 | 39.5 | 7.9 | 31.6 |
| 22 | 78 | 50 | 10 | 40 | 39.0 | 7.8 | 31.2 |
| 23 | 77 | 50 | 10 | 40 | 38.5 | 7.7 | 30.8 |
| 24 | 76 | 50 | 10 | 40 | 38.0 | 7.6 | 30.4 |
| 25 | 75 | 50 | 10 | 40 | 37.5 | 7.5 | 30.0 |

TABLE I

Table for Ex. I Series—Point 4 on triangular graph (Figure 3)

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 1 | 99 | 60 | 10 | 30 | 59.4 | 9.9 | 29.7 |
| 2 | 98 | 60 | 10 | 30 | 58.8 | 9.8 | 29.4 |
| 3 | 97 | 60 | 10 | 30 | 58.2 | 9.7 | 29.1 |
| 4 | 96 | 60 | 10 | 30 | 57.6 | 9.6 | 28.8 |
| 5 | 95 | 60 | 10 | 30 | 57.0 | 9.5 | 28.5 |
| 6 | 94 | 60 | 10 | 30 | 56.4 | 9.4 | 28.2 |
| 7 | 93 | 60 | 10 | 30 | 55.8 | 9.3 | 29.9 |
| 8 | 92 | 60 | 10 | 30 | 55.2 | 9.2 | 27.6 |
| 9 | 91 | 60 | 10 | 30 | 54.6 | 9.1 | 27.3 |
| 10 | 90 | 60 | 10 | 30 | 54.0 | 9.0 | 27.0 |
| 11 | 89 | 60 | 10 | 30 | 53.4 | 8.9 | 26.7 |
| 12 | 88 | 60 | 10 | 30 | 52.8 | 8.8 | 26.4 |
| 13 | 87 | 60 | 10 | 30 | 52.2 | 8.7 | 26.1 |
| 14 | 86 | 60 | 10 | 30 | 51.6 | 8.6 | 25.8 |

TABLE I—Continued

*Table for Ex. I Series—Point 4 on triangular graph (Figure 3)*

| Per Cent Glycid | Per Cent Remaining 3 Reactants | Per Cent Remaining 3 Reactants Based on Triangular Graph | | | Per Cent Remaining 3 Reactants Calculated Back to Allow for Per Cent Glycid | | |
|---|---|---|---|---|---|---|---|
| | | Resin | EtO | PrO | Resin | EtO | PrO |
| 15 | 85 | 60 | 10 | 30 | 51.0 | 8.5 | 25.5 |
| 16 | 84 | 60 | 10 | 30 | 50.4 | 8.4 | 25.2 |
| 17 | 83 | 60 | 10 | 30 | 49.8 | 8.3 | 24.9 |
| 18 | 82 | 60 | 10 | 30 | 49.2 | 8.2 | 24.6 |
| 19 | 81 | 60 | 10 | 30 | 48.6 | 8.1 | 24.3 |
| 20 | 80 | 60 | 10 | 30 | 48.0 | 8.0 | 24.0 |
| 21 | 79 | 60 | 10 | 30 | 47.4 | 7.9 | 23.7 |
| 22 | 78 | 60 | 10 | 30 | 46.8 | 7.8 | 23.4 |
| 23 | 77 | 60 | 10 | 30 | 46.2 | 7.7 | 23.1 |
| 24 | 76 | 60 | 10 | 30 | 45.6 | 7.6 | 22.8 |
| 25 | 75 | 60 | 10 | 30 | 45.0 | 7.5 | 22.5 |

Having thus described our invention, what we claim as new and desire to secure by Letters Patent is:

1. A cogeneric mixture of a homologous series of glycol ethers of oxyalkylation-susceptible, fusible, organic solvent-soluble, water-insoluble, phenol-aldehyde resins; said cogeneric mixture being derived exclusively from phenol-aldehyde resins, glycide, ethylene oxide and propylene oxide in such weight proportions so the average composition of said cogeneric mixture stated in terms of initial reactants lies within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie within the trapezoidal area defined in Figure 3 by points 1, 2, 3 and 4; said resin being derived by reaction between a difunctional monohydric phenol and an aldehyde having not over 8 carbon atoms and having one functional group reactive toward said phenol; said resin being formed in the substantial absence of trifunctional phenols; said phenol being of the formula

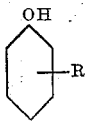

in which R is a hydrocarbon radical having at least 4 and not more than 14 carbon atoms and substituted in one of the positions ortho and para.

2. A cogeneric mixture of a homologous series of glycol ethers of oxyalkylation-susceptible, fusible, organic solvent-soluble, water-insoluble phenol-aldehyde resins; said cogeneric mixture being derived exclusively from phenol-aldehyde resins, glycide, ethylene oxide and propylene oxide in such weight proportions so the average composition of said cogeneric mixture stated in terms of initial reactants lies within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie within the parallelogram defined in Figure 3 by points 5, 6, 3 and 7; said resin being derived by reaction between a difunctional monohydric phenol and an aldehyde having not over 8 carbon atoms and having one functional group reactive toward said phenol; said resin being formed in the substantial absence of trifunctional phenols; said phenol being of the formula

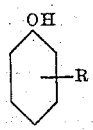

in which R is a hydrocarbon radical having at least 4 and not more than 14 carbon atoms and substituted in one of the positions ortho and para.

3. A non-detersive cogeneric mixture of a homologous series of glycol ethers of oxyalkylation-susceptible, fusible, organic solvent-soluble, water-insoluble, low-stage phenol-aldehyde resins; said non-detersive cogeneric mixture being derived exclusively from phenol-aldehyde resins, glycide, ethylene oxide and propylene oxide in such weight proportions so the average composition of said cogeneric mixture stated in terms of initial reactants lies within the truncated trapezoidal pyramid identified as E, F, G, H—I, J, K, L in Figure 4, with the proviso that the percentage of glycide is within the limits of 2% to 25% by weight and that the remaining three initial reactants, recalculated to a 100% basis, lie within the parallelogram defined in Figure 3 by points 5, 6, 3 and 7; said resin being derived by reaction between a difunctional monohydric phenol and an aldehyde having not over 8 carbon atoms and having one functional group reactive toward said phenol; said resin being formed in the substantial absence of trifunctional phenols; said phenol being of the formula.

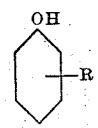

in which R is a hydrocarbon radical having at least 4 and not more than 14 carbon atoms and substituted in one of the positions ortho and para; and with the proviso that the hydrophile properties of said oxyalkylated resin in an equal weight of xylene are sufficient to produce an emulsion when said xylene solution is shaken vigorously with one to three volumes of water.

4. The product of claim 3 wherein the aldehyde is formaldehyde.

5. The product of claim 3 wherein the aldehyde is formaldehyde and R is a butyl radical.

6. The product of claim 3 wherein the aldehyde is formaldehyde and R is an amyl radical.

7. The product of claim 3 wherein the aldehyde is formaldehyde and R is a nonyl radical.

MELVIN DE GROOTE.
BERNHARD KEISER.

REFERENCES CITED

The following references are of record in the file of this patent:

UNITED STATES PATENTS

| Number | Name | Date |
|---|---|---|
| 2,076,624 | De Groote | Apr. 13, 1937 |
| 2,501,015 | Wirtel | Mar. 21, 1950 |